United States Patent
O'Grady et al.

(10) Patent No.: US 10,683,711 B2
(45) Date of Patent: Jun. 16, 2020

(54) FRICTIONAL ENHANCEMENT OF MATING SURFACES OF POWER CABLE INSTALLED IN COILED TUBING

(71) Applicant: Baker Hughes, a GE Company, LLC, Houston, TX (US)

(72) Inventors: Kenneth O'Grady, Collinsville, OK (US); John Mack, Catoosa, OK (US); Scott Strattan, Broken Arrow, OK (US); David Robert Roy, Midland, TX (US)

(73) Assignee: Baker Hughes, a GE Company, LLC, Houston, TX (US)

( * ) Notice: Subject to any disclaimer, the term of this patent is extended or adjusted under 35 U.S.C. 154(b) by 171 days.

(21) Appl. No.: 15/872,139

(22) Filed: Jan. 16, 2018

(65) Prior Publication Data

US 2018/0202242 A1 Jul. 19, 2018

Related U.S. Application Data

(60) Provisional application No. 62/448,168, filed on Jan. 19, 2017.

(51) Int. Cl.
*E21B 17/20* (2006.01)
*F04D 13/06* (2006.01)
(Continued)

(52) U.S. Cl.
CPC ........ *E21B 17/206* (2013.01); *F04D 13/0693* (2013.01); *C09J 7/20* (2018.01); *C09J 201/02* (2013.01); *C09J 2201/16* (2013.01); *C09J 2201/32* (2013.01); *E21B 43/128* (2013.01); *F05D 2250/63* (2013.01); *H01B 7/046* (2013.01)

(58) Field of Classification Search
CPC ...... E21B 17/206; E21B 43/128; H01B 7/046
See application file for complete search history.

(56) References Cited

U.S. PATENT DOCUMENTS

| 4,681,169 A | 7/1987 | Brookbank, III |
| 5,191,173 A * | 3/1993 | Sizer ..................... E21B 17/206 174/102 R |

(Continued)

FOREIGN PATENT DOCUMENTS

CN 205751611 U 11/2016

OTHER PUBLICATIONS

International Search Report and Written Opinion dated May 3, 2018 for corresponding PCT/US2018/014289.

*Primary Examiner* — Caroline N Butcher
(74) *Attorney, Agent, or Firm* — Bracewell LLP; James E. Bradley

(57) ABSTRACT

A string of coiled tubing for an electrical submersible well pump has insulated power conductors encased in an elastomeric jacket within the coiled tubing. A textured interface between the jacket and the inner side wall of the coiled tubing enhances frictional engagement between the jacket and the coiled tubing. The textured interface may be formed on the inner side wall of the coiled tubing and consist of a roughened or knurled surface. A tape may be wrapped helically around the jacket, the tape having an outer side with a textured surface in contact with the inner side wall of the coiled tubing. The textured interface may extend continuously for the length of the coiled tubing.

11 Claims, 4 Drawing Sheets

(51) Int. Cl.
   *C09J 7/20*      (2018.01)
   *E21B 43/12*     (2006.01)
   *C09J 201/02*    (2006.01)
   *H01B 7/04*      (2006.01)

(56) References Cited

U.S. PATENT DOCUMENTS

| | | |
|---|---|---|
| 5,782,301 A | 7/1998 | Neuroth et al. |
| 5,821,451 A | 10/1998 | Neuroth et al. |
| 5,920,032 A | 7/1999 | Aeschbacher et al. |
| 6,143,988 A | 11/2000 | Neuroth et al. |
| 6,167,915 B1 | 1/2001 | Collie et al. |
| 6,192,983 B1 | 2/2001 | Neuroth et al. |
| 6,260,615 B1 | 7/2001 | Dalrymple et al. |
| 6,479,752 B1 | 11/2002 | Neuroth et al. |
| 6,695,062 B2 | 2/2004 | Dalrymple et al. |
| 7,044,223 B2 | 5/2006 | Dalrymple et al. |
| 7,905,295 B2 | 3/2011 | Mack |
| 2009/0120632 A1 | 5/2009 | Worman et al. |
| 2016/0047210 A1 | 2/2016 | Pinkston et al. |

\* cited by examiner

FRICTIONAL ENHANCEMENT OF MATING SURFACES OF POWER CABLE INSTALLED IN COILED TUBING

CROSS REFERENCE TO RELATED APPLICATION

This application claims priority to provisional application Ser. No. 62/448,168, filed Jan. 19, 2017.

FIELD OF THE DISCLOSURE

The present disclosure relates to electrical submersible pump systems for well bore fluids, and more specifically to a power cable for the pump motor that is installed in coiled tubing, the coiled tubing and the power cable having frictionally enhanced mating surfaces.

BACKGROUND

Electrical submersible pumps (ESP) are often used to pump fluids from hydrocarbon wells. An ESP includes a motor, a pump, and a seal section that reduces a pressure differential between well fluid on the exterior and dielectric lubricant in the motor interior. An ESP may have other components, such as a gas separator or additional pumps, seal sections and motors in tandem.

A power cable extends from the surface to the motor for supplying three-phase power. Usually, the power cable has three conductors, each of which is separately insulated. A single elastomeric jacket is extruded over the three insulated conductors. A metal strip or armor wraps around the jacket. In round cable, the exterior of the jacket is cylindrical in cross-section. In some installations, a tube extends alongside the armor of the power cable. The tube may be used to convey liquids, or the tube may have an instrument wire located inside. It is known to wrap the tube and the armor together with another metal strip.

In most cases, a string of production tubing supports the ESP, and bands secure the power cable to and alongside the production tubing. When the ESP has to be retrieved for repair or replacement, a workover rig is required to pull the tubing along with the power cable and ESP.

It is desirable to avoid having to employ a workover rig to retrieve the ESP. However, a conventional power cable cannot support its own weight in many wells, thus needs additional support. One technique involves placing the power cable within coiled tubing, which is a continuous length of metal tubing deployed from a reel. The pump discharges up an annular space surrounding the coiled tubing.

Various methods have been proposed and employed to transfer the weight of the power cable to the coiled tubing. In one method, the power cable with armor is pulled through the coiled tubing after the coiled tubing has been formed. Various standoffs or dimples formed in the coiled tubing engage the armor to anchor the power cable within the coiled tubing. In another method, the power cable without an armor is placed in the coiled tubing as the coiled tubing is being formed and seam welded.

SUMMARY

A power delivery and support assembly for an electrical submersible well pump comprises a coiled tubing having an inner side wall. Insulated power conductors are encased in an elastomeric jacket within the coiled tubing. A textured interface between the jacket and the inner side wall of the coiled tubing enhances frictional engagement between the jacket and the coiled tubing.

The textured interface may be formed on the inner side wall of the coiled tubing. The textured interface may be a roughened surface. The textured interface may comprise a knurled surface on the inner side wall of the coiled tubing. The textured interface may comprise a pattern of teeth formed in the inner side wall of the coiled tubing, the teeth protruding radially inward toward a center line of the coiled tubing.

A tape may be wrapped helically around the jacket, the tape having an outer side in contact with the inner side wall of the coiled tubing. In one embodiment, the textured interface is located on the outer side of the tape. The textured interface may comprise a roughened surface on the outer side of the tape. The tape may have side edges that are spaced apart from side edges of adjacent ones of the turns, placing helical portions of the jacket between the turns of the tape in contact with the inner side wall of the coiled tubing. The outer side of the tape may have a roughened surface in contact with a textured surface located on an inner side wall of the coiled tubing.

A hanger on an upper end of the coiled tubing supports the coiled tubing in a wellhead. An adapter connects a lower side of the coiled tubing to the electrical submersible well pump. The textured interface may extend continuously from the adapter to the hanger.

Figure 1:
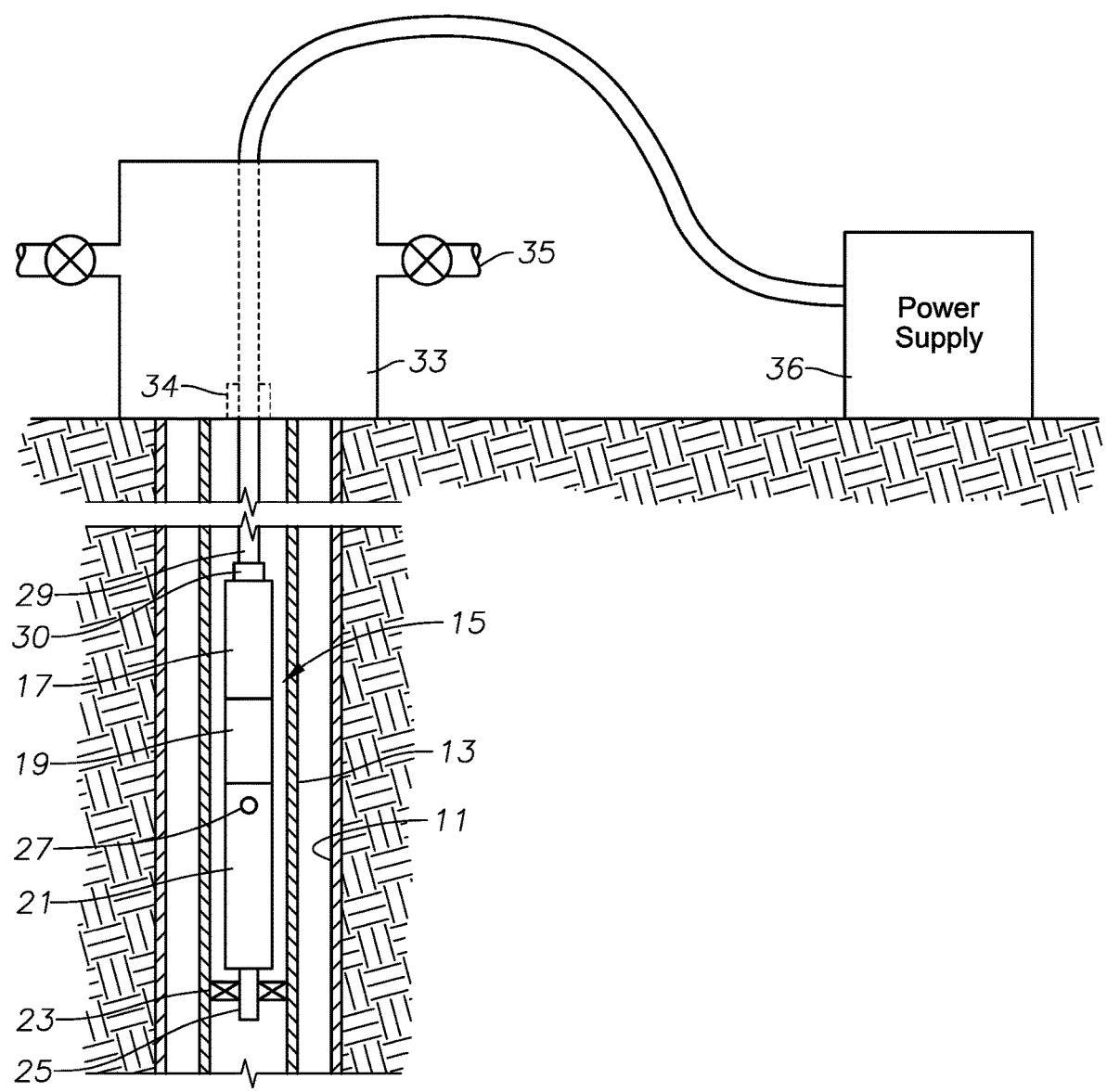
FIG. 1 is a schematic view of an electrical submersible pump assembly having a power cable installed in coiled tubing in accordance with this disclosure and shown installed in a well.

While the invention will be described in connection with the preferred embodiments, it will be understood that it is not intended to limit the invention to that embodiment. On the contrary, it is intended to cover all alternatives, modifications, and equivalents, as may be included within the spirit and scope of the invention as defined by the appended claims.

DETAILED DESCRIPTION

The method and system of the present disclosure will now be described more fully hereinafter with reference to the accompanying drawings in which embodiments are shown. The method and system of the present disclosure may be in many different forms and should not be construed as limited to the illustrated embodiments set forth herein; rather, these embodiments are provided so that this disclosure will be thorough and complete, and will fully convey its scope to those skilled in the art. Like numbers refer to like elements throughout. In an embodiment, usage of the term "about" includes +/−5% of the cited magnitude. In an embodiment, usage of the term "substantially" includes +/−5% of the cited magnitude.

It is to be further understood that the scope of the present disclosure is not limited to the exact details of construction, operation, exact materials, or embodiments shown and described, as modifications and equivalents will be apparent to one skilled in the art. In the drawings and specification, there have been disclosed illustrative embodiments and, although specific terms are employed, they are used in a generic and descriptive sense only and not for the purpose of limitation.

Referring to FIG. 1, a well casing 11 has a string of production tubing 13. An electrical submersible pump (ESP) 15 is located within production tubing 13. In this example, ESP 15 has an electrical motor 17 on the upper end, normally a three-phase type. A seal section 19 connects to the lower end of motor 17 and has a pressure equalizer to reduce a pressure differential between lubricant in motor 17 and well fluid on the exterior. A pump 21 secures to the lower end of seal section 19. Pump 21 may be a centrifugal pump with a large number of stages, each stage having an impeller and a diffuser. Alternately, pump 19 could be another type of pump, such as a progressing cavity pump or a linear reciprocating pump. Pump 21 has an intake 25 that extends through a packer 23 for drawing in well fluid. Pump 21 has a discharge 27 on its upper end that discharges well fluid into an annulus surrounding seal section 19 and motor 17 within production tubing 13. Other configurations and types of ESP 15 are feasible.

A string of coiled tubing 29 connects to an adapter 30 on the upper end of motor 17 and supports ESP 15 within production tubing 13. Coiled tubing 29 comprises a continuous length of a steel tube that has a capability of being wound around a large reel when out of the well. A wellhead assembly or tree 33 supports coiled tubing 29 with a coiled tubing hanger 34 on the upper end of coiled tubing 29. Well fluid being pumped by ESP 15 flows from production tubing 13 into wellhead assembly 33 and out a flow line 35. Coiled tubing 29 is electrically connected to an adjacent controller or power supply 36.

Figure 2:
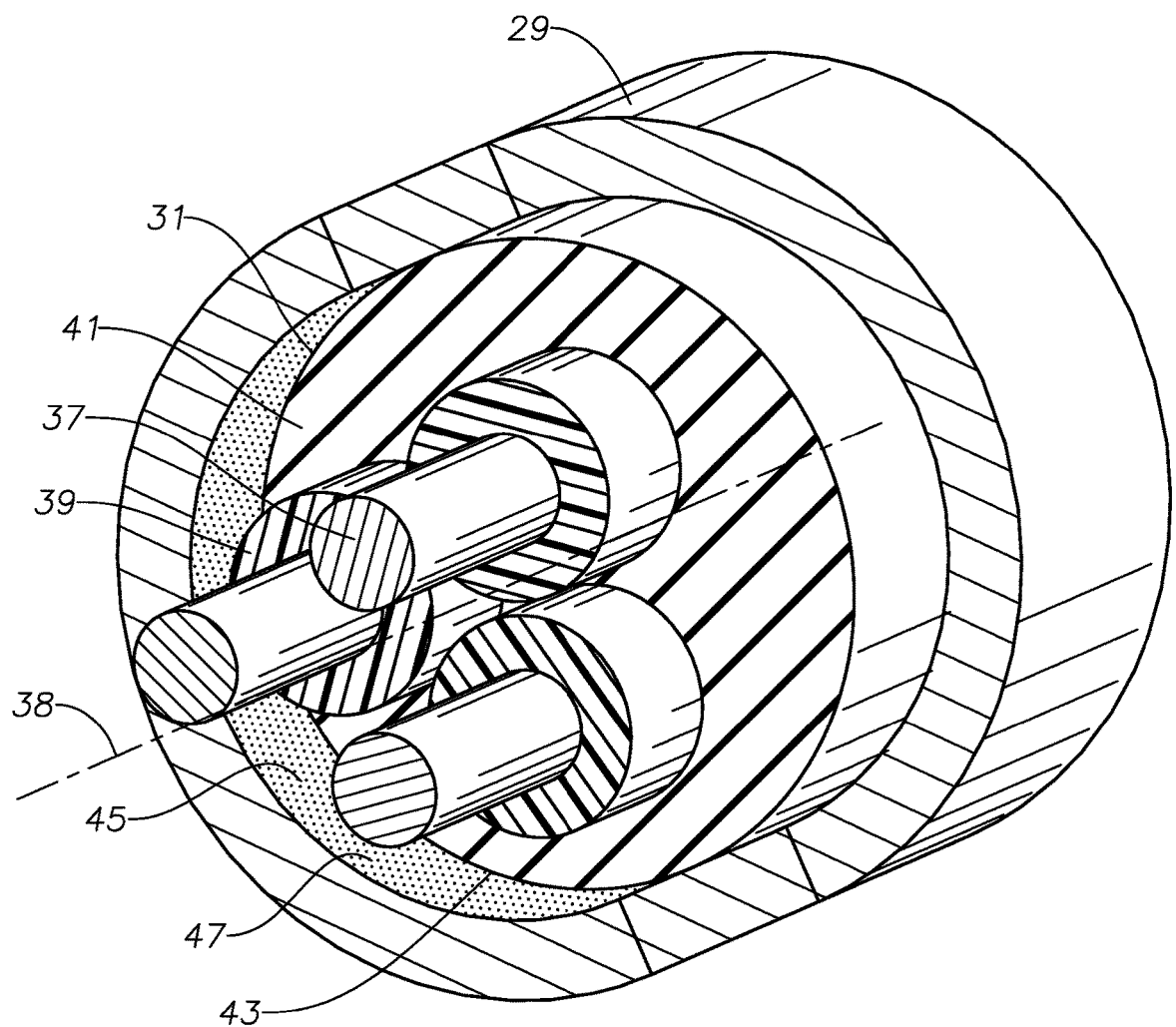
FIG. 2 is a perspective view, partially sectioned, of a first embodiment of the power cable and coiled tubing for the pump assembly of FIG. 1.

Referring to FIG. 2, coiled tubing 29 contains a power cable 31 for supplying electrical power to motor 17. Power cable 31 includes three electrical conductors 37 for delivering power to motor 27. Each conductor 37 is of electrically conductive material, such as copper. At least one electrical insulation layer 39 surrounds each conductor 37. Insulated conductors 37 are twisted about each other along a power cable center line 38. At any point, when viewed in a transverse cross-section perpendicular to power cable center line 38, insulated conductors 37 will appear oriented 120 degrees apart from each other. The twisting of insulated conductors 37 enables power cable 31 to be rolled onto a reel.

An elastomeric jacket 41, also of a conventional material, is extruded around all three of the insulated conductors 37. Jacket 41 may be either electrically conductive or electrically non-conductive, and it optionally may have longitudinally extending grooves or ridges (not shown) on its cylindrical exterior. Insulation layer 39 and jacket 41 may be of a variety of conventional polymeric insulation materials. Suitable materials include the following: EPDM (ethylene propylene dienne monomer), NBR (nitrile rubber), HNB Hydrogenated Nitrile rubber, FEPM aflas rubber, FKM rubber, polypropylene (PP), polyethylene (PE), cross-linked PE or PP, thermoplastic elastomers, fluoropolymers, thermoplastics or thermoset elastomers.

Jacket 41 has a cylindrical outer side wall 43 in frictional engagement with a cylindrical inner side wall 45 of coiled tubing 29. A textured interface between outer side wall 43 and inner side wall 45 enhances friction to resist power cable 31 from sliding downward within coiled tubing 29 after installation. In the embodiment of FIG. 2, the textured interface comprises a roughened or textured surface 47 on inner side wall 45. Roughened surface 47 may be created in a variety of manners, such as bead blasting, sand blasting, chemical etching and the like.

Power cable 31 is formed, then installed in coiled tubing 29 while coiled tubing 29 is being manufactured. When power cable 31 is installed during manufacturing, coiled tubing 29 is rolled from a flat strip into a cylindrical shape, and a seam weld is made of the abutting edges. Roughened surface 47 will be created on the initial metal strip prior to the metal strip being rolled around power cable 31 and seam welded.

Figure 3:
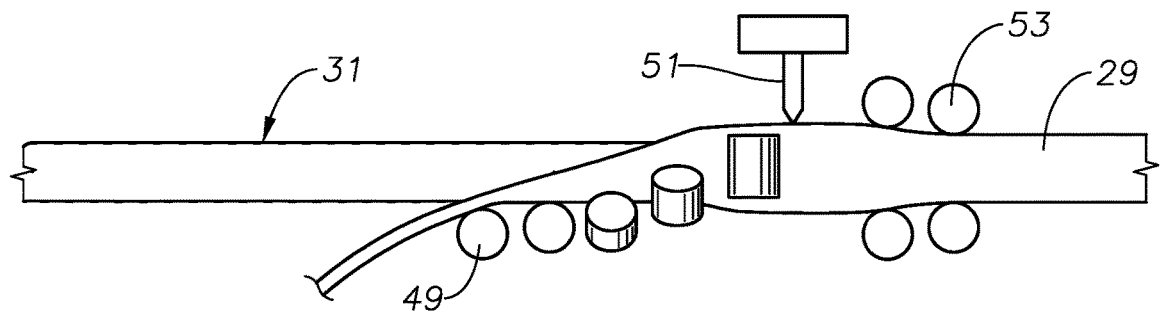
FIG. 3 is a schematic side view of the power cable and coiled tubing of FIG. 2 being manufactured.

FIG. 3 schematically illustrates a manufacturing process of installing power cable 31 in coiled tubing 29 while the coiled tubing is being manufactured. Forming rollers 49 deform a flat strip or plate into a cylindrical configuration around power cable 31 in a continuous process. Then a welding device, such as a laser torch 51, welds the seam. After welding, coiled tubing 29 undergoes a swaging process with swage rollers 53 to reduce the initial diameter of coiled tubing 29 to a final diameter. Before the swaging process, an annular gap between jacket outer side wall 43 and coiled tubing inner side wall 45 may exist. Afterward, the annular gap will disappear, with jacket 41 being under compression by coiled tubing 29. Coiled tubing roughened surface 47 will engage and grip jacket outer side wall 43.

The material of jacket 41 is preferably non compressible, although jacket 41 can be deformed. As an example, during the swaging process the outer diameter of coiled tubing 29 may decrease by an amount from about 0.010 to 0.050 inch. Coiled tubing 29 is not annealed after the welding process, thus may be ready for use after the swaging process.

Typical power cable for an ESP will have a metal armor strip helically wrapped around the exterior of the jacket. The helical turns of the metal armor strip overlap each other. Eliminating the metal armor strip saves in weight of the power cable/coiled tubing assembly, allowed the power cable/coiled tubing assembly to be employed in deeper wells. Depending on the size of the coiled tubing, eliminating the metal armor, as in this disclosure, can save 0.5 to 0.75 pounds per foot, as an example.

Figure 4:
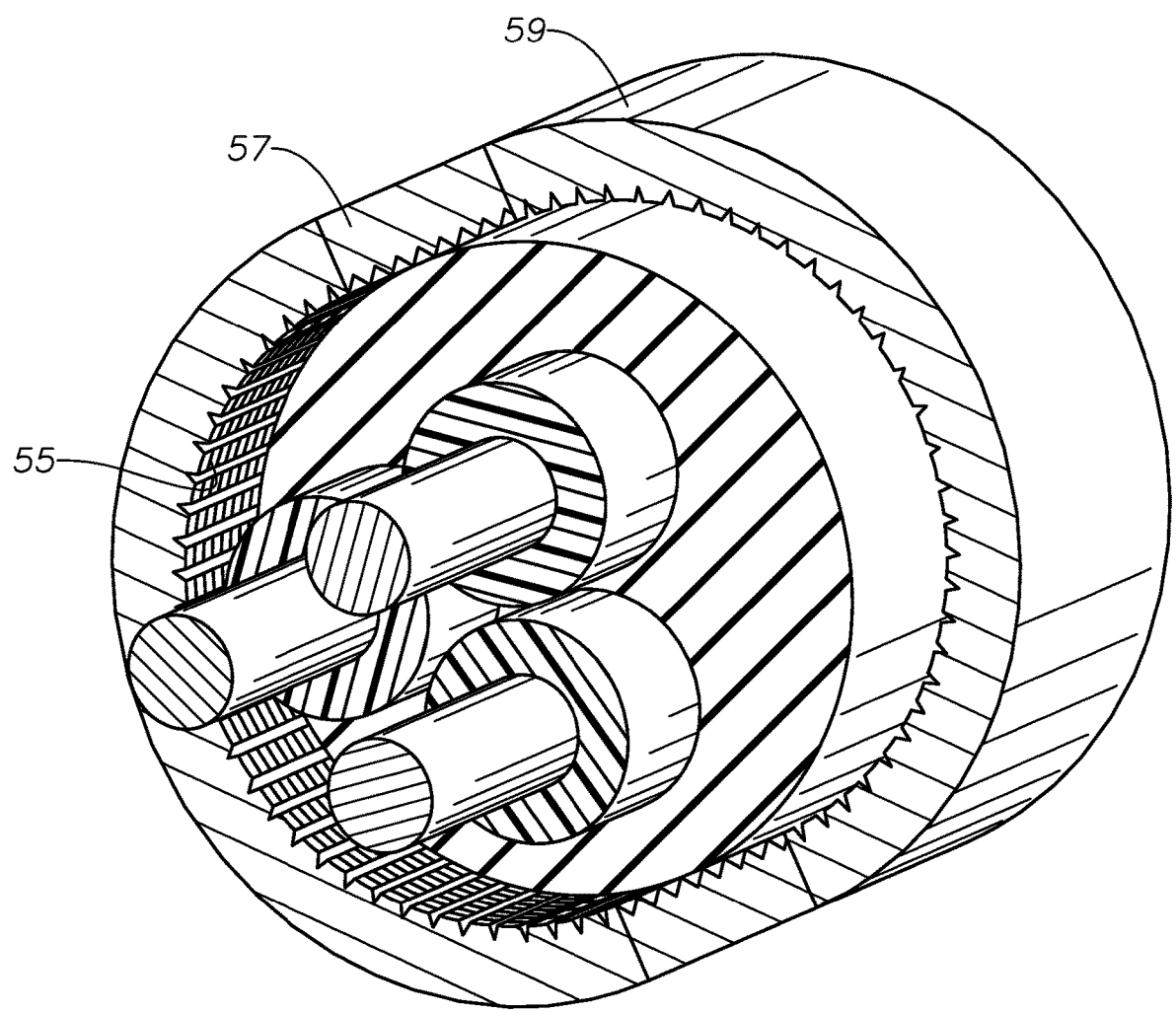
FIG. 4 is a sectional view of a second embodiment of the power cable and coiled tubing of FIG. 1.

FIG. 4 illustrates a second embodiment of a frictional interface, which comprises a knurled surface 55 on the inner side wall of coiled tubing 57. Knurled surface 55 creates a pattern of teeth that embed into the outer side wall of jacket 59. After forming, the teeth of knurled surface 55 point radially inward toward centerline 28. Knurled surface 55 is machined on the flat strip prior to the strip being rolled into coiled tubing 57.

Figure 5:
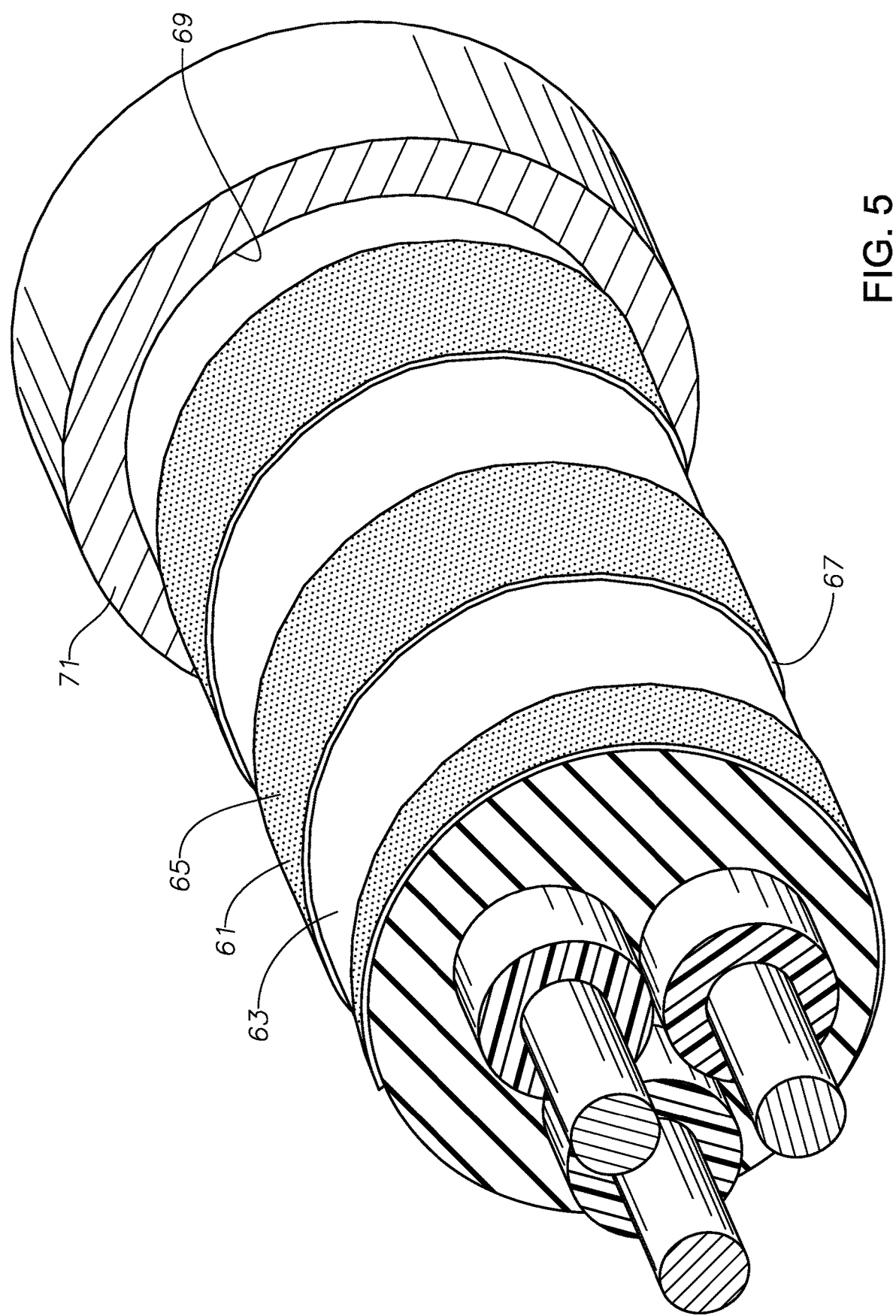
FIG. 5 is a sectional view of a third embodiment of the power cable and coiled tubing of FIG. 1.

FIG. 5 shows a tape 61 wrapped helically around the exterior of jacket 63. Tape 61 has a roughened outer surface 65, which may be created by a grit layer adhered to tape 61 or by knurling or gripping ribs formed on the outer surface of tape 61. Alternately, tape 61 could have a roughened surface on its inner surface or both sides. The inner side of tape 61 may have an adhesive coating to bond to the exterior of jacket 63; or the inner side may also have a roughened surface similar to outer surface 65. Tape 61 may be ferrous or nonferrous.

In this embodiment, tape 61 has side edges 67 that are spaced from apart from side edges 67 of adjacent helical turns of tape 61. The wrapping in this manner of tape 67 leaves a helical portion of jacket 63 exposed. Inner side wall 69 of coiled tubing 71 may have a textured or roughened surface similar to textured surface 47 (FIG. 2) or knurled surface 55 (FIG. 4). Alternately, inner side wall 69 could be smooth. Inner side wall 69 will be in contact with roughed outer surface 65 of tape 61. Inner side wall 69 will also be in contact with the helical exposed portion of the outer side of jacket 63.

The frictional interfaces described could be continuous for the entire length of the coiled tubing and power cable, from adapter 30 to coiled tubing hanger 34 (FIG. 1). Alternately, the frictional interfaces need not be applied along the entire length of the coiled tubing and power cable, but located in sections spaced apart from each other along the length of the power cable and coiled tubing.

The present invention described herein, therefore, is well adapted to carry out the objects and attain the ends and advantages mentioned, as well as others inherent therein. While a few embodiments have been given for purposes of disclosure, numerous changes exist in the details of procedures for accomplishing the desired results. These and other similar modifications will readily suggest themselves to those skilled in the art, and are intended to be encompassed within the scope of the appended claims.

The invention claimed is:

1. A power delivery and support assembly for an electrical submersible well pump, comprising:
   a coiled tubing having an inner side wall;
   a plurality of insulated power conductors encased in an elastomeric jacket within the coiled tubing;
   a tape wrapped helically around the jacket, the tape having an outer textured interface in contact with the inner side wall of the coiled tubing; and wherein
   the outer textured interface comprises a grit layer, knurling or gripping ribs formed on an outer side of the tape.

2. The assembly according to claim 1, wherein:
   the inner side wall of the coiled tubing is smooth.

3. The assembly according to claim 1, further comprising:
   an adhesive layer between an inner side of the tape and the jacket that bonds the tape to the jacket.

4. The assembly according to claim 1, further comprising:
   an inner textured interface comprising a grit layer, knurling or gripping ribs formed on an inner side of the tape.

5. The assembly according to claim 1, further comprising:
   a hanger on an upper end of the coiled tubing for supporting the coiled tubing in a wellhead;
   an adapter at a lower end of the coiled tubing for connecting the coiled tubing to the electrical submersible well pump; and wherein
   the textured interface extends continuously from the adapter to the hanger.

6. A power delivery and support assembly for an electrical submersible well pump, comprising:
   a coiled tubing having an inner side wall;
   a plurality of insulated power conductors encased in an elastomeric jacket within the coiled tubing;
   a tape wrapped in helical turns around the jacket;
   the tape having an outer side with an outer textured surface formed thereon in contact with an inner side wall of the coiled tubing and an inner side with an inner textured surface formed thereon in contact with the jacket; wherein
   the inner textured surface and the outer textured surface comprise a grit layer, knurling or gripping ribs.

7. The assembly according to claim 6, wherein the inner side wall of the coiled tubing is smooth.

8. The assembly according to claim 6, further comprising:
   a hanger on an upper end of the coiled tubing for securing the coiled tubing to a wellhead;
   an adapter at a lower end of the coiled tubing for connecting the coiled tubing to the electrical submersible well pump; and wherein
   the textured surface extends continuously from the adapter to the hanger.

9. A power delivery and support assembly for an electrical submersible well pump, comprising:
   a coiled tubing having a smooth inner side wall;
   a plurality of insulated power conductors encased in an elastomeric jacket within the coiled tubing;
   a tape wrapped in helical turns around the jacket; and
   an outer roughened surface formed on an outer side of the tape in frictional contact with the smooth inner side wall of the coiled tubing, the outer roughened surface comprising a grit layer, knurling or gripping ribs.

10. The assembly according to claim 9, further comprising:
    an inner roughened surface comprising a grit layer, knurling or gripping ribs formed on an inner side of the tape in frictional contact with the jacket.

11. The assembly according to claim 9, further comprising:
    a hanger on an upper end of the coiled tubing for securing the coiled tubing to a wellhead;
    an adapter at a lower end of the coiled tubing for connecting the coiled tubing to the electrical submersible well pump; and wherein
    the tape extends continuously from the adapter to the hanger.

* * * * *